Sept. 9, 1924.  
E. S. LINCOLN  
CURRENT COLLECTOR  
Filed Sept. 14, 1921  
1,507,612

Witness  
H. J. Stromberger.

Inventor  
Ellis S. Lincoln.  
By (signature)  
Attorney

Patented Sept. 9, 1924.

1,507,612

UNITED STATES PATENT OFFICE.

ELLIS S. LINCOLN, OF MANSFIELD, OHIO, ASSIGNOR TO THE OHIO BRASS COMPANY, OF MANSFIELD, OHIO, A CORPORATION OF NEW JERSEY.

CURRENT COLLECTOR.

Application filed September 14, 1921. Serial No. 500,574.

*To all whom it may concern:*

Be it known that I, ELLIS S. LINCOLN, a citizen of Sweden, residing at Mansfield, in the county of Richland and State of Ohio, have invented certain new and useful Improvements in Current Collectors, of which the following is a specification.

My invention relates to a current collecting device by which current is drawn from a trolley wire to a moving car or bus which is operated without the use of a track and known as a trackless trolley system.

In such a system the car or bus is free to move out of alinement with the overhead trolley wires and the current collecting device which is maintained on the bus must be free to follow the overhead trolley wire or wires, without jumping, whenever the bus swings to one side of the center line of the overhead trolley and this distance may be ten feet or more, depending on conditions.

As the bus is usually equipped with rubber tires, the bus is insulated electrically from the ground; hence there are required two overhead trolley wires and this necessitates two separate collectors from the wires to the bus or an arrangement whereby the current may be led to the bus by a single device.

My invention has for its object a device whereby a single arrangement may be used between two trolley wires and the bus and the bus permitted to swing out of alinement with the trolley wires at will in either direction and also take up inequalities in the trolley wires, especially as to their distance apart and horizontal relation.

In the accompanying drawing—

Figure 1:
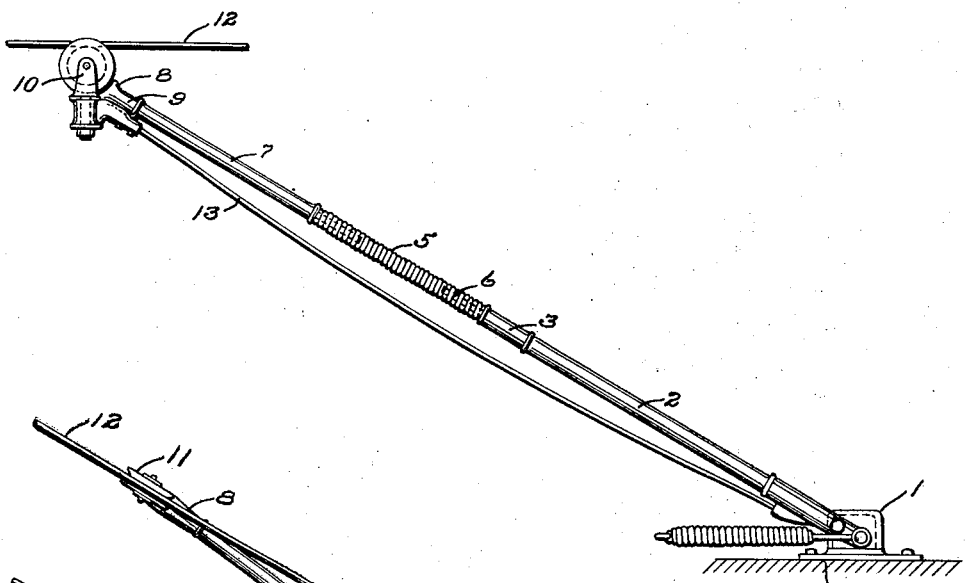
Fig. 1 is a side view of my invention shown as secured at one end to a bus B and the other end engaging the trolley wire.

In the preferred form of my invention I mount a trolley base 1 upon the roof of the bus. This base is of any of the well known devices on the market which tends to raise the pole under spring tension and permits the pole to swing freely from side to side.

I do not claim anything new or novel in the base.

I employ a single pole 2 for attachment to the base and at the end of the pole 2 I secure a forked casting 3 having two branches 4—4 diverging at an angle. Secured to each branch is a spring 5 secured to the projecting stem 6 on each fork, or the spring may be secured in any other well known manner, as for instance, by making the forks hollow and slipping the ends of the spring therein.

Figure 2:
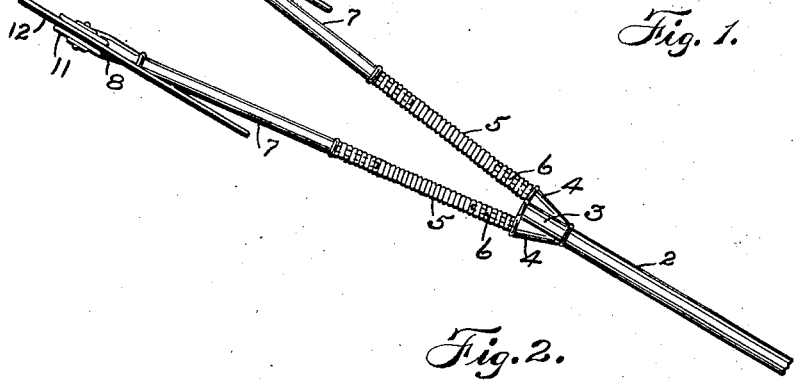
Fig. 2 is a top plan view of my invention, without the base, with the collector wheels in engagement with two trolley wires.

Secured to the outer end of each spring is a short pole 7 and the attachment between the spring 5 and pole 7 may be as described above for attachment of the spring to the forked casting. To the outer end of each pole 7 or spring arm is a trolley head 8 having a body member 9 and a swivel harp 10 mounted in the body member 9 to pivot freely to permit the trolley wheel 11 mounted on the harp to freely aline with the trolley wire 12 as shown in Fig. 2.

The members 2 and 7 may be of metal or wood and if of wood, means must be provided to conduct the current from the head 8 to an insulated point on the base or directly into the bus and this is accomplished by means of the flexible cable 13 connected to the head 8. If the members 2 and 7 are made of metal, it will be obviously necessary to introduce insulation between the head 8 and the member 2 or between the spring 5 and the member 3 and in the latter case it will be advisable but not necessary to use the cable 13 as the spring 5 may not be of sufficient carrying capacity to conduct the current without considerable loss and heating.

The collector engaging the trolley wire may be of the rolling or sliding type, both being in common use, and is so mounted on the body member 9 that it is very free to pivot or swivel to maintain its alinement with the trolley wire. The spring member 5 interposed between the pole member 2 and each of the auxiliary pole members 7 permits universal movement of the pole 7 relative to the pole 2 and even permits a longitudinal movement away from the member 2, and towards the member 2 if the spring coils are not in contact with each other. The spring 5 must be of such dimensions as to maintain the auxiliary pole 7 in a reasonably fixed relation to the pole 2 under normal operating conditions but permitting the members 7 to yield to variations from the normal.

Figure 3:
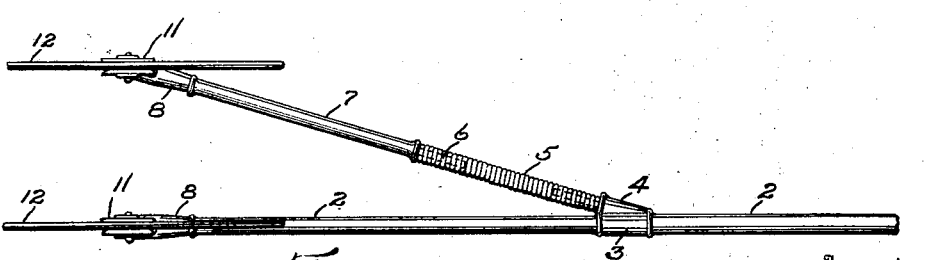
Fig. 3 shows a top plan view of a modification of my invention shown in Figs. 1 and 2.

In Fig. 3 the pole 2 extends from the base to the trolley wire with a pivoted collector 8 at the conductor end of the pole and with which the collector contacts, and intermediate the ends of the pole an arm 7 is secured to the pole by means of a resilient member 5 and permitting universal movement of the arm relative to the pole. A current collector 8 is mounted on the end of the arm and free to pivot and aline with the conductor.

It will be apparent that with fixed trolley wires and a bus or car free to swing to either side from the center line of the trolley wires and drawing its current from the trolley wires by means of a trolley pole and collector that the base, pole and collector must be free to act quickly and the collector to cling to the wire and my invention will permit of such operation.

Having disclosed my invention, I claim—

1. The combination with a moving vehicle adapted to operate without rails of a trolley pole, means interposed between the pole and vehicle acting to maintain the outer end of the pole in a raised position, a pair of auxiliary arms of insulating material projecting from the extremity of the pole and each arm provided with current collecting means to engage a trolley wire, each auxiliary arm universally movable and independently of the other, means interposed between each auxiliary arm and the pole to connect the arms and pole and permit said universal movement of the arms and means for conveying the current from the collecting means to the vehicle.

2. The combination with a moving vehicle adapted to operate without rails, of a trolley pole, means interposed between the pole and vehicle acting to apply a pressure thereto to raise the outer end of the pole, independent auxiliary arms projecting from the outer end of the pole, current collecting means on each arm to engage a trolley wire, said current collector acting to maintain its alinement with the trolley wire at all times regardless of the position of the vehicle relative to the trolley wire, and means interposed between the trolley pole and each auxiliary arm permitting universal motion of the pole and arms relative to each other.

3. A trolley pole comprising a main member, a pair of independent insulating arms secured to the main member by interposed means normally maintaining each arm and the main member in the same general direction and permitting universal movement of each arm relative to the main member and a current collector secured to each arm and arranged to pivot or rotate freely to aline with the trolley wire at all times, and means to conduct the current from the collector to a vehicle to which the main member is secured.

4. A trolley pole comprising a main member, a pair of independent current collectors each to engage a trolley conductor and free to maintain its alinement with the trolley at all times and means interposed between each current collector and the main member to electrically insulate each collector from the main member and permit universal movement of each collector relative to the main member.

5. The combination with a plurality of trolley conductors of a collecting device comprising a main member, a plurality of collecting members each engaging one of the trolley conductors and provided with means to permit the collector to freely maintain alinement with its trolley conductor, means interposed between the collector and the main member to insulate the collecting members from the main member, to maintain them in a normal relation to the main member under normal conditions and to permit their freedom of movement relative to the main member under stress, and means to yieldingly hold the collecting device with the collecting members in engagement with the conductors.

6. A trolley pole comprising a main member, an independent insulating arm secured to the main member by interposed means permitting universal movement of the arm relative to the main member, and a current collector secured to the arm and arranged to pivot freely to aline itself with the trolley wire at all times, and means to conduct the current from the collector to a vehicle to which the main member is secured.

7. A trolley pole comprising a main member, a current collector to engage a trolley conductor and free to maintain its alinement with the conductor at all times and means interposed between the current collector and the main member to permit universal movement of the collector relative to the main member.

8. The combination with a unitary pole, of a plurality of diverging arms secured to the pole by means permitting universal and independent movement of each arm relatively to the pole and circuit collecting means secured to each arm and free to maintain its alinement with a current conductor at all times.

9. The combination with a trolley pole, of a pair of diverging elongated springs, each of which has one end supported by the trolley pole, a contact-carrying arm supported by the outer end of each of said springs and a current collector secured to the outer end of each arm and free to maintain its alinement with a current collector at all times.

10. A current collecting device comprising an upwardly spring pressed pole, a plurality of arms diverging from one end of the pole, resilient means interposed between each arm and the pole to maintain a predetermined relation between the pole and each arm under predetermined stresses and permitting each arm to move universally relative to the pole under abnormal stresses applied to the arms and a current collector mounted on each arm and arranged to pivot freely and aline itself at all times with its conductor.

11. A current collector comprising an upwardly spring pressed pole, a forked member mounted on one end of the pole and provided with means of attaching each fork member to a helical spring of sufficient strength to maintain an arm in a predetermined relation to the pole, an arm secured at one end to each spring, a pivotally mounted current collector secured to the other end of the arm and free to aline itself with an overhead conductor, the spring permitting freedom of movement of the arm relative to the pole.

12. The combination with a pair of parallel trolley wires and a trolley pole of a pair of arms, a current collector on each arm and engaging one of the wires and pivotally mounted to permit the collector to aline freely with the wire regardless of the lateral angles which the arms make with the wires from time to time and spring means interposed between the arms and the pole to connect the arms and pole, maintain the collectors in engagement with the pole and permit universal freedom of movement of the arms relative to the pole.

13. The combination with a trolley pole, of a pair of diverging elongated springs, each of which has one end supported by the trolley pole, and a contact-carrying arm supported by the outer end of each of said springs.

14. The combination with a trolley pole, of a pair of diverging elongated springs, each of which has one end supported by the trolley pole, and a contact-carrying arm supported by the outer end of each of said springs, each of the arms being in alignment with its supporting spring.

In testimony whereof I affix my signature.

ELLIS S. LINCOLN.